Nov. 15, 1966  E. IVARSSON  3,284,861
JOLT DE-SANDING MACHINE FOR MOULD FLASKS
Filed May 8, 1964  4 Sheets-Sheet 1

INVENTOR
Erik Ivarsson

BY Watson, Cole, Grindle & Watson
ATTORNEYS

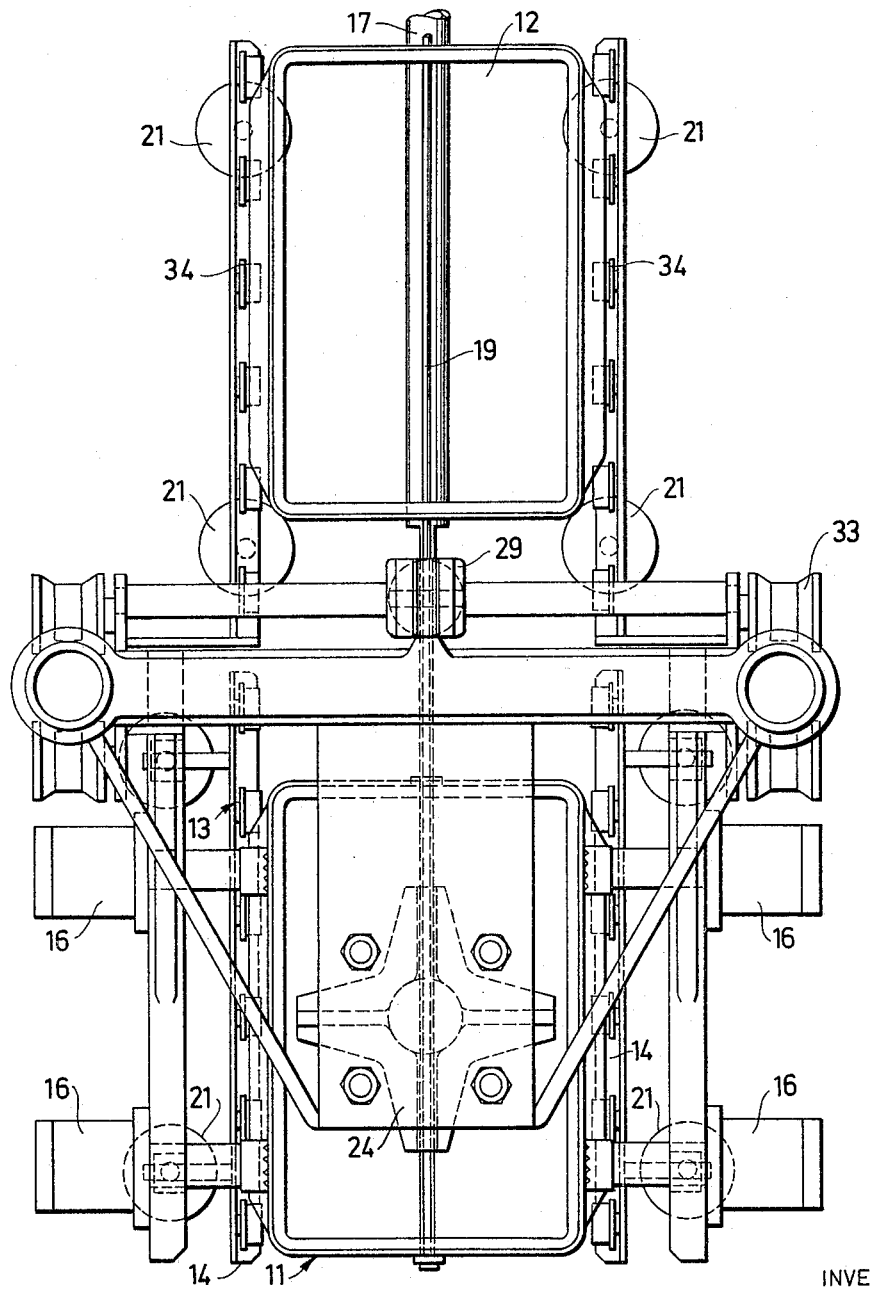

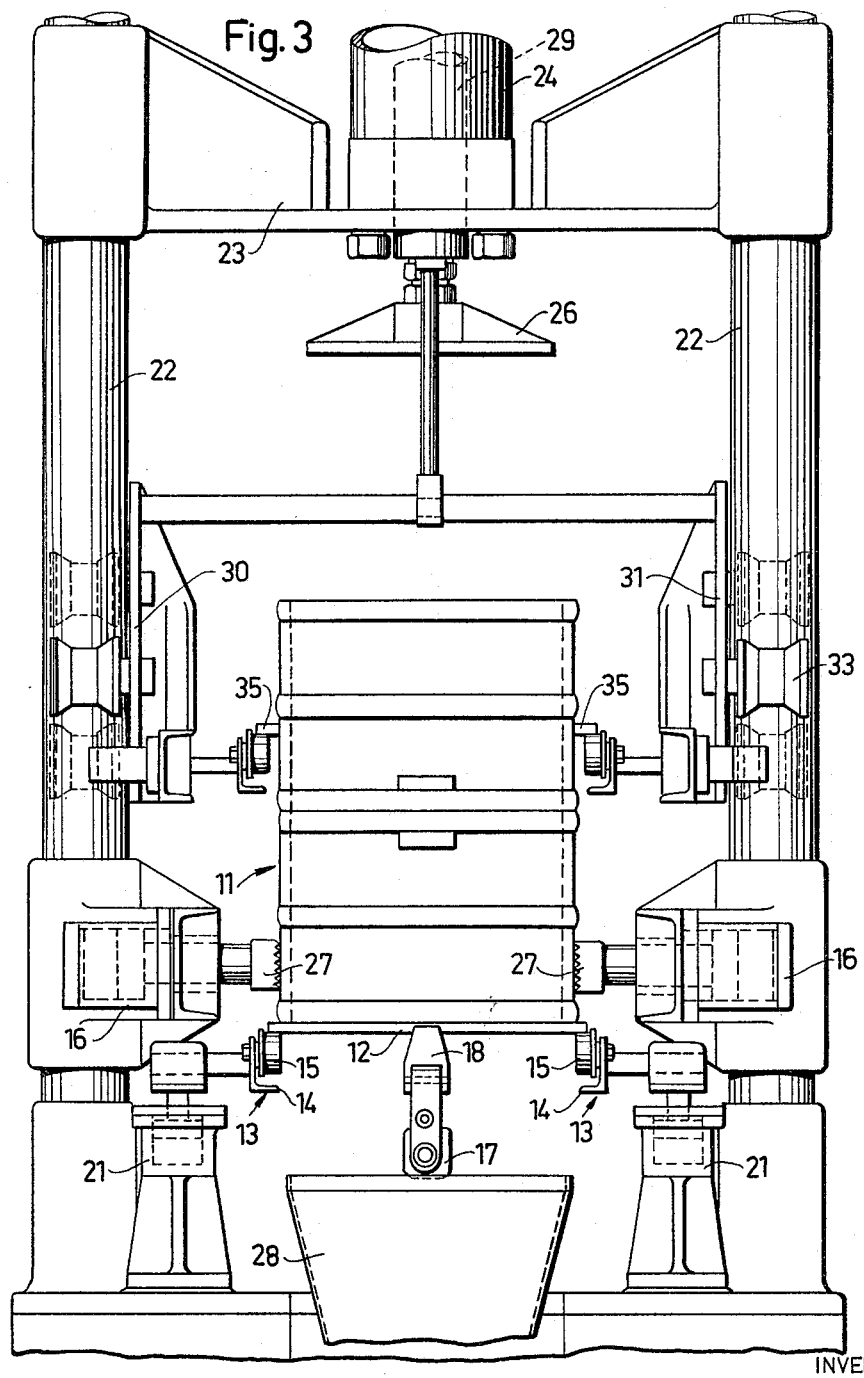

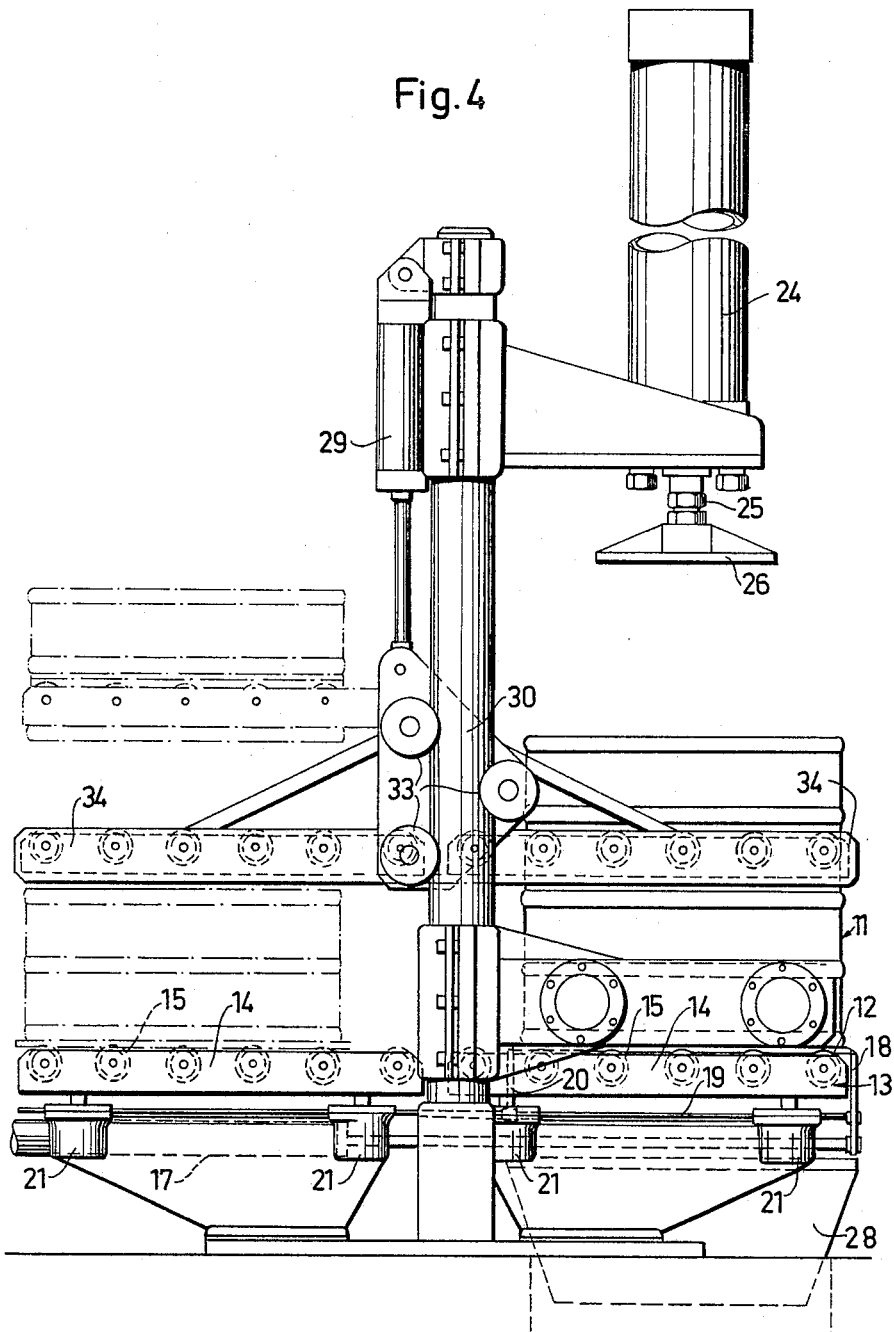

3,284,861
JOLT DE-SANDING MACHINE FOR MOULD FLASKS
Erik Ivarsson, Halmstad, Sweden, assignor to Aktiebolaget Malcus Holmquist, Halmstad, Sweden, a corporation of Sweden
Filed May 8, 1964, Ser. No. 366,009
Claims priority, application Sweden, May 24, 1963, 5,795/63
2 Claims. (Cl. 22—95.5)

The present invention relates to a jolt de-sanding machine, i.e. a machine for removing mould sand and cast articles from mould flasks supported by transport plates after the casting is finished.

The object of the invention is to obtain a machine of this kind which can be combined with a plant comprising one or more moulding machines for the manufacturing of the mould in upper and lower mould flask parts which flask parts are transported to a station where they are put togther and connected to each other to form a mould flask for the casting process. After the casting and also after a desired cooling period the mould is transported to the machine according to the invention in which the cast articles together with the mould sand are removed from the mould flask which then in a suitable way are separated from each other and transported back to the respective moulding machine for re-use.

The machine according to the invention comprises a conveyor supporting the mould flask respectively the transport plate carrying said flask at two opposite sides, a clamping device for holding the mould flask in de-sanding position, a device for separating the transport plate and the mould flask from each other in a vertical direction, a device for removing said transport plate separated from the mould flask and for returning said transport plate to its working position after the de-sanding operation is finished and a de-sanding means which is passed through the mould flask while this is held by the clamping device and the transport plate is removed.

The invention will be further described in connection with the embodiment shown in the attached drawings.

FIG. 2 shows the machine according to the invention in plan view while FIGS. 3 and 4 show the same in end view and side view respectively.

Figure 1:
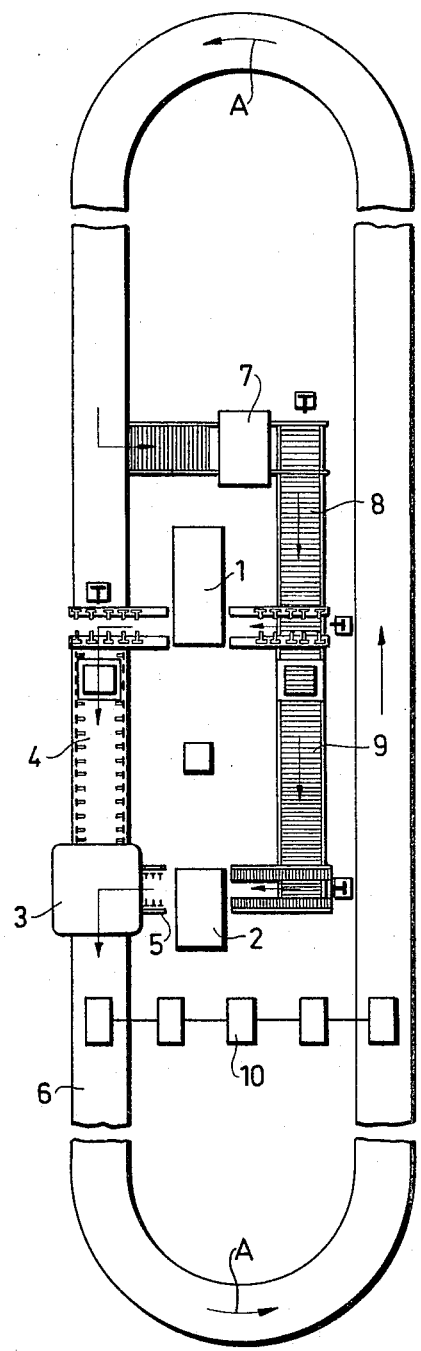
FIG. 1 shows diagrammatically and in plane view a casting plant provided with a machine according to the present invention.

The casting plant which is intended to work substantially automatically, except for a few manual operations such as the insertion of any cores, if needed, comprises in the embodiment shown in FIG. 1 a moulding machine 1 in which the lower half of the mould is made in a lower mould flask part, and a second moulding machine 2 in which the upper half of the mould is made in an upper mould flask part. After the manufacturing of the two halves of the mould in the respective moulding machines 1 and 2 these two mould halves are transported to a station 3 by means of suitable conveyors 4 and 5 during which transport any required cores are inserted in the lower mould half. After having turned around the upper mould flask part and after having put the mould flask parts together the mould flask is moved out onto a conveyor 6 where the casting operation takes place. During the cooling of the casting the mould flask is then by means of the conveyor 6 moved in the direction shown by the arrows A to a jolt de-sanding machine 7 in which the de-sanding operation takes place. In this machine the two flask parts are also separated from each other and are then by means of separate conveyors 8 and 9 transported to the moulding machines 1 and 2 respectively for re-use.

The above described steps and also the filling of the mould sand, the vibration, the packing as well as the supply of flask weights by means of the conveyor 10, only diagrammatically shown, and the de-standing operation described more in detail in the following can be controlled pneumatically, hydraulically and/or electrically in any suitable way. Hereby the lower mould flask part is preferably used for releasing the desired control pulses.

As shown in FIGS. 2–4 the machine according to the present invention is provided with a conveyor 13 supporting the mould flask 11 and the transport plate 12 carrying the same at two opposite sides. In the present embodiment this conveyor comprises four bars 14 arranged in pairs opposite each other, each provided with five rotatably mounted supporting rollers 15.

The frame of the jolt de-sanding machine is provided with four horizontally situated working cylinders, FIGS. 2 and 3, arranged in pairs opposite each other and with the ends of the piston rods facing the space in which the mould flask 11 is shown in FIG. 2.

At a level somewhat below the conveyor 13 it is provided a horizontal working cylinder 17 with comparatively great working stroke. This working cylinder is provided with a pivotally mounted carrier 18 at the end of the piston rod which carrier is intended to cooperate with the transport plate 12 when the working cylinder is shortened. In parallel with the piston rod of the working cylinder 17 a rod 19 is guided which is firmly fixed to the outer end of the piston rod so that it is moved together with the piston rod and which is provided with an abutment 20 the object of which will be further described in the following.

As is to be clearly seen especially from FIGS. 3 and 4 each of the bars 14 of the conveyors 13 is supported by two working cylinders 21 and all those cylinders 21 are operated simultaneously for lowering and raising respectively of the conveyors 13.

At both sides of the space where the de-sanding of the flask takes place there are two columns 22 between the upper ends of which is provided a yoke 23 which carries a working cylinder 24. This is vertically arranged and has its piston rod 25 directed downwardly. The lower end of the piston rod 25 is provided with a pressure plate 26 for the de-sanding of the mould flask 11.

As far as now described the machine according to the invention functions as follows.

When the mould flask 11 supported on the transport plate 12 has reached the de-sanding position, resting on the rollers 15, the mould flask is gripped at two opposite sides by means of the working cylinders 16 the piston rods of which are provided with elastic pressure pads 27 or the like to improve the gripping action. By means of these working cylinders the mould flask 11 is held while the transport plate 12 is lowered due to the lowering of the conveyors 13 by means of the working cylinders 21. Thus the transport plate is free from the mould flask and can be moved laterally by means of the working cylinder 17 so that the lower side of the mould flask is opened. This movement is obtained in that the carrier 18 comes into contact with the edge of the transport plate. After the lower side of the mould flask is free the piston rod 25 of the working cylinder 24 is moved downwardly so that the pressure plate 26 presses the cast article and the mould sand out of the mould flask onto a vibrating grate or the like, preferably via a hopper 28.

After the de-sanding operation and after vibration or blasting, if desired, of the mould flask the transport plate 12 is returned in that the abutment 20 gets into contact with the opposite edge of the transport plate 12 and then the conveyors 13 are raised so that the mould flask 11 rests on the same and is allowed to be moved away from the machine.

After the described de-sanding operation the mould flask in the assembled condition can be moved away to one or the other side from the de-sanding position and then transported to the moulding machines for re-use. It is, however, also possible, as shown in FIGS. 3 and 4, to divide the mould flask in the upper and lower parts in connection with the de-sanding operation which mould flask parts are transported to the two different moulding machines along separate paths. For this reason the yoke 23 according to FIGS. 3 and 4 supports a second working cylinder 29 provided for a vertical displacement of two slides 30 and 31 which by means of each three rollers 33 are guided on the columns 22. The slides are provided with horizontal conveyors 34 which are substantially of the same kind as the conveyors 13. These conveyors 34 cooperate with flanges 35 projecting from opposite sides of the upper mould flask part in order to raise this part after the de-sanding operation is finished, to an upper conveyor path (not shown) for transporting said part to a moulding machine while the lower mould flask part is transported to the other moulding machine along a separate conveyor path.

As indicated above, the jolt de-sanding machine is provided with the necessary pulse-generating and switching means for the control of the various steps on pneumatic, hydraulic or electrical way or combinations thereof and of course there is the necessary automatic means to obtain the desired delays, etc., but as such devices are well known for the man skilled in the art and neither is any part of the invention it is not considered necessary to describe them in detail.

Several modifications and detail changes can be made within the scope of the following claims.

I claim:
1. A jolt de-sanding machine for a mould flask supported by a transport plate, comprising a conveyor, a transport plate support for generally horizontal movement on the conveyor, said transport plate carrying the flask at opposite sides of the latter, a clamping device for vertically supporting the flask in de-sanding position, a device for separating the transport plate and the flask from each other in a vertical direction, a device for removing said transport plate generally horizontally from beneath the mould flask and for returning said transport plate to its operative position beneath said flask after completion of the de-sanding operation, and a de-sanding means supported for downward movement through the mould flask while same is supported by the clamping device and while the transport plate is removed from beneath the mould flask, the said device for separating the transport and the mould flask from each other in a vertical direction comprising an elevating mechanism for moving the conveyor and the transport plate thereon toward and away from the lower side of the mould flask while the flask is supported in a stationary vertical position, and a second conveyor above the first-mentioned conveyor, said second conveyor being arranged for cooperation with opposite sides of the upper part of said mould flask, and means for raising and lowering said second conveyor in order to raise the said upper flask part from the lower flask part after completion of the de-sanding operation, said second conveyor extending to one side of the de-sanding station for transporting the upper flask part in a path above the path pursued by the first said conveyor and the lower flask part supported by the transport plate on said first conveyor.

2. A jolt de-sanding machine as defined in claim 1, further including slides supporting said second conveyor, vertical support columns, said slides being guided for movement on said vertical columns, a yoke supported by said columns, said yoke supporting the said de-sanding means, and a working cylinder carried by said yoke for moving the said slides.

References Cited by the Examiner
UNITED STATES PATENTS

| | | | |
|---|---|---|---|
| 1,159,707 | 11/1915 | Peterson | 22—95.5 |
| 1,337,268 | 4/1920 | Prince | 22—95.5 |
| 3,150,425 | 9/1964 | Carpenter et al. | 22—95.5 |

J. SPENCER OVERHOLSER, *Primary Examiner.*

R. D. BALDWIN, *Assistant Examiner.*